United States Patent
Tanaka et al.

(10) Patent No.: US 11,200,152 B2
(45) Date of Patent: Dec. 14, 2021

(54) IDENTIFYING DIAGNOSIS COMMANDS FROM COMMENTS IN AN ISSUE TRACKING SYSTEM

(71) Applicant: INTERNATIONAL BUSINESS MACHINES CORPORATION, Armonk, NY (US)

(72) Inventors: Yosuke Tanaka, Yokohama (JP); Jiayun Zhu, Edogawa-ku (JP); Chikafumi Yasumoto, Shinagawa-Ku (JP); Tsend Ochir Bat Ulzii, Edogawa-ku (JP); Takuya Ishikawa, Machida (JP); Takayuki Kushida, Machida (JP)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 16/460,547

(22) Filed: Jul. 2, 2019

(65) Prior Publication Data
US 2021/0004312 A1   Jan. 7, 2021

(51) Int. Cl.
G06F 11/36   (2006.01)
G06Q 10/10   (2012.01)

(52) U.S. Cl.
CPC ......... *G06F 11/368* (2013.01); *G06Q 10/101* (2013.01)

(58) Field of Classification Search
CPC .. G06F 11/3688; G06F 11/362; G06F 11/366; G06F 11/368; G06Q 10/101
See application file for complete search history.

(56) References Cited

U.S. PATENT DOCUMENTS

| | | |
|---|---|---|
| 7,096,459 B2 | 8/2006 | Keller et al. |
| 2012/0173243 A1 | 7/2012 | Anand et al. |
| 2014/0006861 A1 | 1/2014 | Jain et al. |
| 2015/0006519 A1 | 1/2015 | Jain et al. |
| 2017/0262360 A1* | 9/2017 | Kochura ............... G06F 40/194 |

(Continued)

OTHER PUBLICATIONS

Aran-Fey, "Why Doesn't This Code Work When Wrapped in a Generic Function?", [online], [Retrieved on Jun. 24, 2019], Retrieved from the Internet at <URL: https://stackoverflow.com/questions/47974703/why-doesnt-this-code-work-when-wrapped-in-a-generic-function>, 4 pp.

(Continued)

*Primary Examiner* — S. Sough
*Assistant Examiner* — Cheneca Smith
(74) *Attorney, Agent, or Firm* — Janaki K. Davda; Konrad Raynes Davda & Victor LLP

(57) ABSTRACT

Provided are techniques for identifying diagnosis commands from comments in an issue tracking system. A new issue ticket describing an issue for a test that failed and that has a test case identifier is received. A past issue ticket for the test that has the test case identifier is identified, where the past issue ticket identifies a set of issue ticket comments. A concluding owning team change event is identified in the set of issue ticket comments. A comment with a diagnosis command that triggered the concluding owning team change event is identified in the set of issue ticket comments. A suggestion of the diagnosis command is provided by highlighting the concluding owning team change event and the comment. The new issue ticket is assigned to an owning team of the concluding owning team change event.

15 Claims, 17 Drawing Sheets

(56) References Cited

U.S. PATENT DOCUMENTS

2019/0121719 A1* 4/2019 Hamon ............... G06F 11/3664
2019/0332524 A1* 10/2019 Jayaswal ............. G06F 11/3664
2020/0151083 A1* 5/2020 Chauhan ............. G06F 11/0751

OTHER PUBLICATIONS

Cubranic, D., et al., "Automatic Bug Triage Using Text Categorization", Proceedings of the Sixteenth International Conference on Software Engineering & Knowledge Engineering, 2004, 6 pp. (Available at: http://citeseerx.ist.psu.edu/viewdoc/download?doi=10.1.1.91.6144&rep=rep1&type=pdf).

Github, "About Teams", [online], [Retrieved on Jan. 21, 2019], Retrieved from the Internet at <URL: https://help.github.com/enterprise/2.14/user/articles/about-teams/>, 5 pp.

Manhaes, M.M., et al., "Building Cognitive Applications with IBM Watson Services: vol. 4 Natural Language Classifier", IBM Redbook, May 2017, 142 pp.

Mell, P., et al., "Effectively and Securely Using the Cloud Computing Paradigm", NIST, Oct. 7, 2009, 80 pp.

Mell, P., et al., "The NIST Definition of Cloud Computing", NIST, Special Publication 800-145, Sep. 2011, 7 pp.

* cited by examiner

| Defect 27108 | | |
|---|---|---|
| Summary: * (IVT) CI42 Unable to connect to hive by 500 error | | |
| Overview  Investigation  Release Notes  Links  Approvals  History | | |
| History | | |
| Team Member G1 Feb. 14, 2018 4:01PM<br>Status            Reopened → Resolved<br>Resolution       <none> → Fixed<br>Tags<br>   Removed:<br>      gxp2.1_regress_ivt<br>   Added:<br>      gxp2.1_ivt | | |
| Comments [#39]   A new ticket will be opened for the issue in comment #38, I changed this defect back to Resolved state.<br>Resolved By      Unassigned → Team Member G1<br>Resolution Date  <Unassigned> → Feb 14, 2018, 4:01:17 PM | | |
| Team Member G1 Feb. 13, 2018 5:22PM<br>Tags<br>   Removed:<br>      gxp2.1_ivt<br>   Added:<br>      gxp2.1_regress_ivt | | |
| Team Member H23 Feb. 13, 2018 5:13PM<br>Status            Resolved → Reopened<br>Resolution       Fixed → <none><br>Owned By         Team Member D14 -> Team Member G1 ——810<br>Comments [#38]   The problem occurs again. Could you check it? | | |

FIG. 8A

Issue Defect 27108

Team Member L5 changed title 2 months ago

Team Member L5 changed branch 2 months ago

⋮

860 — Team Member X40 assigned to Team Member L5 less than a minute ago

```
int getOwningTeamChangeTriggeringCommentIndex(CommandDetectModel commandDetectModel,
OwningTeamChangeEvent concludingOwningTeamChangeEvent) { const int MAX_COMMENTS_TO_EXAMINE = 5;

const int TRIGGERING_COMMENT_NOT_FOUND_INDEX = -1;

int currentCommentIndex =
        commentList.getLastCommentIndexBefore(concludingOwningTeamChangeEvent.getTimestamp());

int commentExamined = 0;

while ((triggeringCommentFound  &&  commentExamined < MAX_COMMENTS_TO_EXAMINE
                && currentCommentIndex >=0) {

If (commandDetectModel.classify(commandDetectModel.commentList[currentCommentIndex] ==
    CommandDetectModel.CLASS.COMMAND) { triggeringCommentFound = true;

} else {

--currentCommentIndex;

}
```

```
            ++commentExamined

} // end of while loop if (triggeringCommentFound) { return currentCommentIndex;

} else { return TRIGGERING_COMMENT_NOT_FOUND_INDEX;

IDENTIFYING DIAGNOSIS COMMANDS FROM COMMENTS IN AN ISSUE TRACKING SYSTEM

BACKGROUND

1. Field of the Invention

Embodiments of the invention relate to identifying diagnosis commands from comments in an issue tracking system. Then, the embodiments of the invention provide the diagnosis commands as suggestions.

2. Description of the Related Art

In continuous-delivery-style software development, a smoke test may fail repeatedly because there are many test environments and many components, with each component delivering changes frequently. A smoke test may be described as a preliminary test that is run before other tests to verify basic functions of the software in order to make sure that the software is ready for further testing.

Diagnosis commands may be described as experimental commands that are used to determine which component of a number of components caused the failure.

In the repeated occurrence of failure of the same test case, the diagnosis commands that are presented by the development team in previous occurrences of failure of that test case may be reused by the Quality Assurance (QA) team or the operations team without the development team's intervention.

However, because the diagnosis commands are often are not explicitly recorded in an issue tracking system, it is difficult for QA and operations teams to find the diagnosis commands upon the next occurrence. Then, the development team often needs to be brought in again to present the same diagnosis commands. In some systems, the diagnosis commands are recorded in the issue tracking system as a part of the conversation between the developer, QA team member, and operations team member.

Once the issue is recorded in a new issue ticket, the issue ticket originating QA or operations team assigns the issue ticket to one of the teams by guessing which team may be able to find the solution. However, such guessing may result in time loss if the issue ticket was assigned to an incorrect team and is re-assigned to another team.

SUMMARY

In accordance with embodiments, a computer-implemented method is provided for identifying diagnosis commands from comments in an issue tracking system. The computer-implemented method. A new issue ticket describing an issue for a test that failed and that has a test case identifier is received. A past issue ticket for the test that has the test case identifier is identified, where the past issue ticket identifies a set of issue ticket comments. A concluding owning team change event is identified in the set of issue ticket comments. A comment with a diagnosis command that triggered the concluding owning team change event is identified in the set of issue ticket comments. A suggestion of the diagnosis command is provided by highlighting the concluding owning team change event and the comment. The new issue ticket is assigned to an owning team of the concluding owning team change event.

In accordance with other embodiments, a computer program product is provided for identifying diagnosis commands from comments in an issue tracking system. The computer program product comprises a computer readable storage medium having program code embodied therewith, the program code executable by at least one processor to perform operations. A new issue ticket describing an issue for a test that failed and that has a test case identifier is received. A past issue ticket for the test that has the test case identifier is identified, where the past issue ticket identifies a set of issue ticket comments. A concluding owning team change event is identified in the set of issue ticket comments. A comment with a diagnosis command that triggered the concluding owning team change event is identified in the set of issue ticket comments. A suggestion of the diagnosis command is provided by highlighting the concluding owning team change event and the comment. The new issue ticket is assigned to an owning team of the concluding owning team change event.

In yet other embodiments, a computer system is provided for identifying diagnosis commands from comments in an issue tracking system. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A new issue ticket describing an issue for a test that failed and that has a test case identifier is received. A past issue ticket for the test that has the test case identifier is identified, where the past issue ticket identifies a set of issue ticket comments. A concluding owning team change event is identified in the set of issue ticket comments. A comment with a diagnosis command that triggered the concluding owning team change event is identified in the set of issue ticket comments. A suggestion of the diagnosis command is provided by highlighting the concluding owning team change event and the comment. The new issue ticket is assigned to an owning team of the concluding owning team change event.

BRIEF DESCRIPTION OF THE SEVERAL VIEWS OF THE DRAWINGS

Referring now to the drawings in which like reference numbers represent corresponding parts throughout:

FIGS. 8A and 8B illustrate example issue ticket change histories in accordance with certain embodiments.

FIG. 12 illustrates logic to identify a comment that includes a diagnosis command that triggered the concluding owning teach change event in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
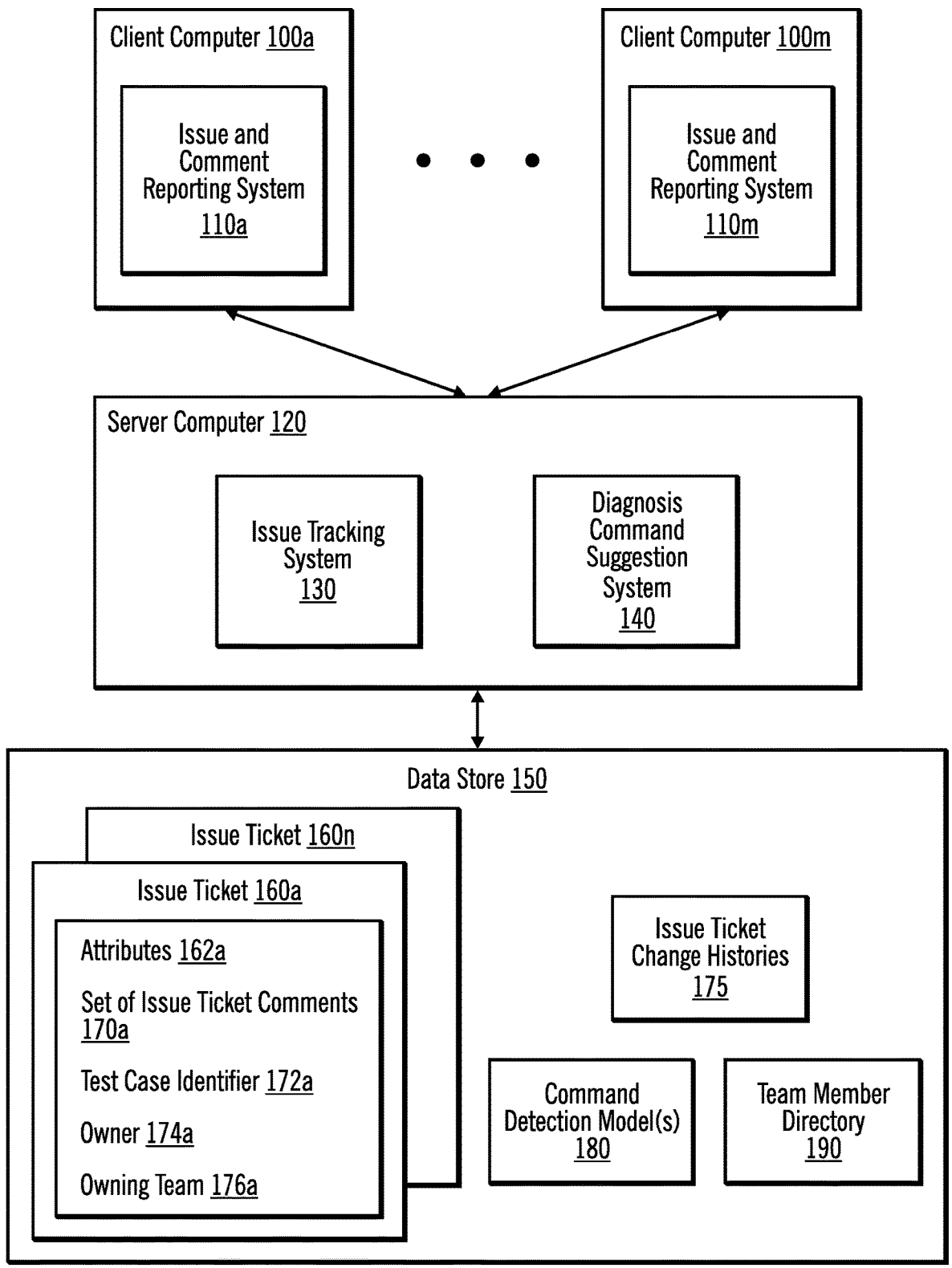
FIG. 1 illustrates, in a block diagram, a computing environment in accordance with certain embodiments.

FIG. 1 illustrates, in a block diagram, a computing environment in accordance with certain embodiments. Client computers 100a . . . 100m are coupled to a server computer 120. The server computer 120 is coupled to a data store 150.

The data store 150 stores issue tickets 160a . . . 160n, issue ticket change histories 175, one or more command detection models 180, and one or more team member directories 190. In certain embodiments, each of the issue tickets 160a . . . 160n has attributes of a set of issue ticket comments (made up of one or more comments), test case identifier (ID), an owner, and an owning team. In other embodiments, each issue ticket 160a . . . 160n may have additional or different attributes.

For example, the issue ticket 160a has as attributes 162a: the set of issue ticket comments 170a, test case identifier 172a, owner 174a, and owning team 176a. The changes to the owner and owning team of issue tickets 160a . . . 160n are recorded as issue ticket change histories 175 (showing, for each set of issue ticket comments for an issue ticket, a history of owning team and owner changes that indicates a change of assignment of an issue ticket for each of the issue ticket comments). An issue ticket 160a . . . 160n describes an issue (e.g., the test fails at point x), while the set of issue ticket comments for the issue ticket 160a . . . 160n describes comments between team members of different teams who are trying to resolve the issue, and these comments may be described as a log of a conversation. Also, each set of issue ticket comments may include an owning team attribute and an owner team member attribute. In certain embodiments, there is one set of issue ticket comments for each issue ticket 160a . . . 160n.

The server computer 120 includes an issue tracking system 130 and a diagnosis command suggestion system 140. In certain embodiments, the issue tracking system 130 receives information on issues, such as failed tests, and generates issue tickets 160a . . . 160n. As team members at different client computers 100a . . . 100m provide comments on an issue via the issue and comment reporting systems 110a . . . 110m, the issue tracking system 130 creates the set of issue ticket comments for the issue ticket 160a . . . 160n.

The diagnosis command suggestion system 140 uses an issue ticket 160a . . . 160n for a past failure of the same test case (having a same test case identifier) to suggest a diagnosis command for the new issue of that same test case. Such a suggested diagnosis command may be referred to as a key diagnosis command. In certain embodiments, the diagnosis command suggestion system 140 uses issue ticket change histories 175 for an issue ticket 160a . . . 160n to extract diagnosis commands from a set of issue ticket comments and determine which component of a set of components is causing the issue.

In certain embodiments, the test case identifier of a failed test is the same test case identifier of a past, failed test, and the diagnosis command suggestion system 140 identifies an issue ticket having a set of issue ticket comments by matching the test case identifier of the failed test with the same test case identifier of the past, failed test.

Each client computer 100a . . . 100m includes an issue and comment reporting system 110a . . . 110m, each of which is used by a team member to notify the issue tracking system 130 of issues and comments regarding the issues. For example, one client computer may be used by a QA team member, while another client computer may be used by an operations team member, and yet another client computer may be used by a developer team member. Then, the different team members provide comments on an issue as they try to resolve the issue by communicating with each other.

Figure 2:
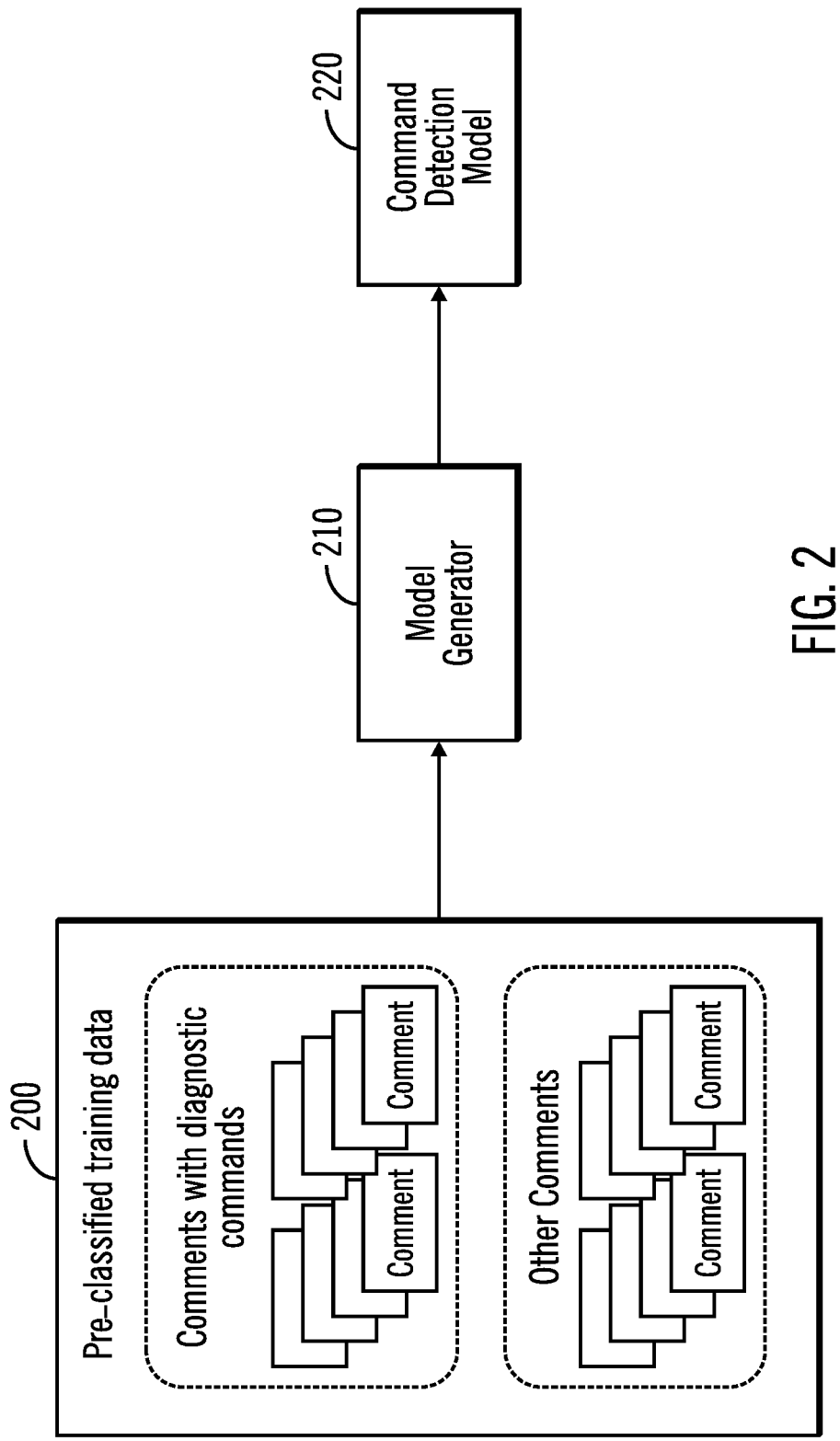
FIG. 2 illustrates generation of an example command detection model in accordance with certain embodiments.

FIG. 2 illustrates generation of an example command detection model 220 in accordance with certain embodiments. In this example, pre-classified training data 200 includes comments with diagnosis commands and other comments (e.g., without diagnosis commands). A model generator 210 uses a natural language classification technique (e.g., Natural Language Processing (NLP) technology) to process the pre-classified training data 200 and output the command detection model 220. The command detection model 220 is an example of the command detection models 180. In certain embodiments, the command detection model is a machine learning model.

In certain embodiments, a command detection model 180 detects comments with diagnosis commands. The command detection model 180 is pre-trained with many sets of issue ticket comments (e.g., hundreds) for many common problem domains. The command detection model 180 may be described as a pre-trained natural language classification model.

In certain embodiments, to accommodate the cases in which an application domain does not fall into the common problem domains, the diagnosis command suggestion system 140 provides an option to train a command detection model 180 with the sets of issue ticket comments for the application problem domain.

In additional embodiments, the diagnosis command suggestion system 140 provides an option to use a keyword search of the comments to search for diagnosis commands as an alternative to the command detection model 180.

Moreover, the diagnosis command suggestion system 140 enables use of a default command keyword list that includes standard commands for different operating systems. The diagnosis command suggestion system 140 also allows custom command keywords to be added. For example, custom keywords may be added for specific products (e.g., a Lightweight Directory Access Protocol (LDAP) search), for commands that take sub commands, and for commands of product-specific Command Line Interface (CLI).

Figure 3A:
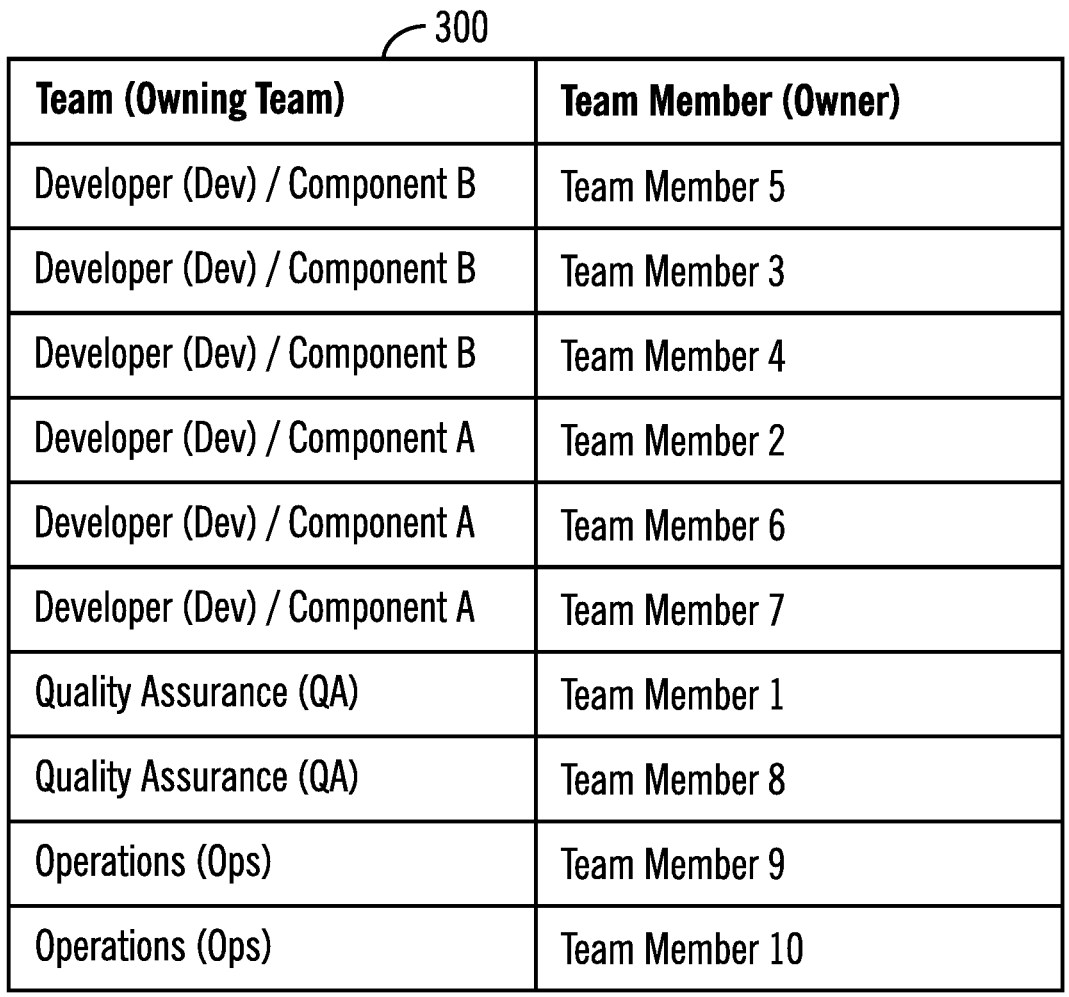
FIGS. 3A and 3B illustrate example team directories in accordance with certain embodiments.
Figure 3B:
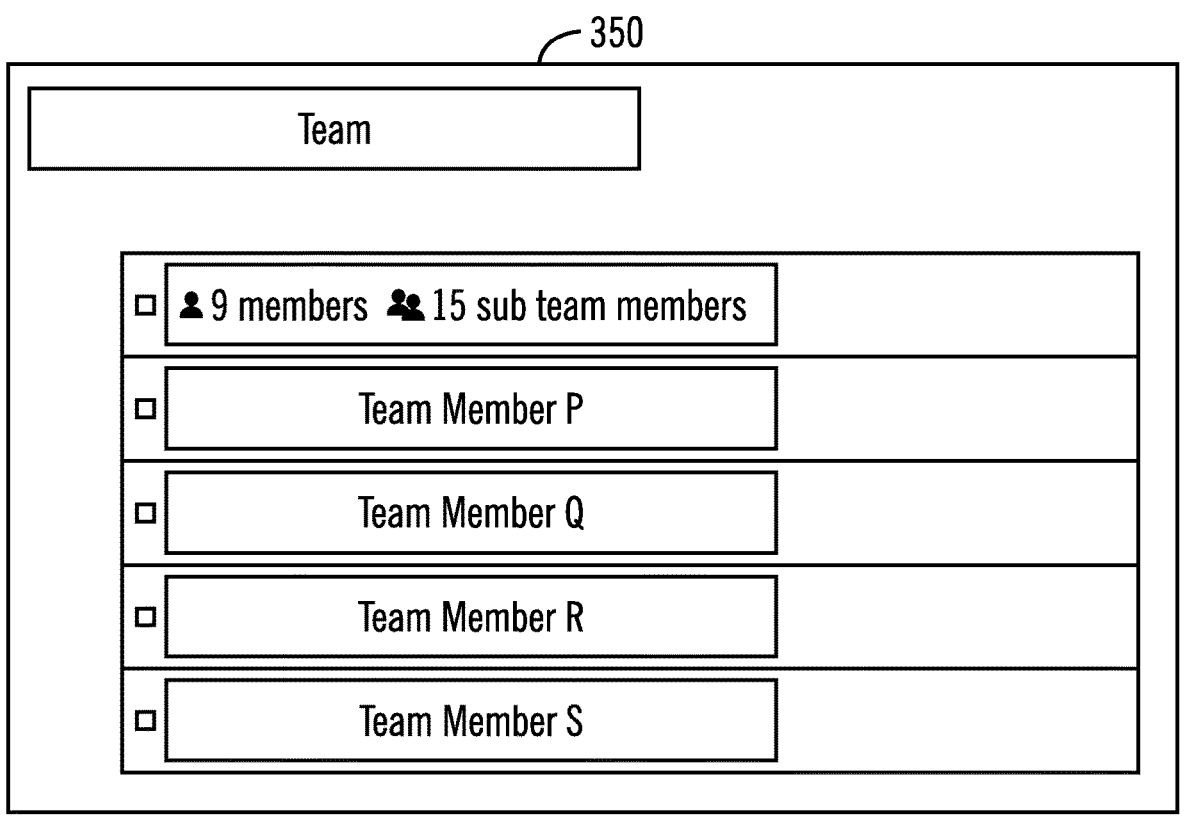

FIGS. 3A and 3B illustrate example team directories 300, 350 in accordance with certain embodiments. FIG. 3A lists a mapping table with a column for a team and a column for a team member. For example, the teams are: developers for Component B, developers for Component A, Quality Assurance, and Operations. The team members are Team Member 1-Team Member 10. The team directory 300 may be used to map each team member to a team. Also, a team member may be considered an "owner", while a team may be considered an "owning team" for owning an issue ticket.

FIG. 3B lists an alternate way of organizing teams and team members. In the example of FIG. 3B, the team directory 350 may be provided by the issue tracking system 130 as a built-in function. In this example team directory 350, each team lists its team members.

Figure 4:
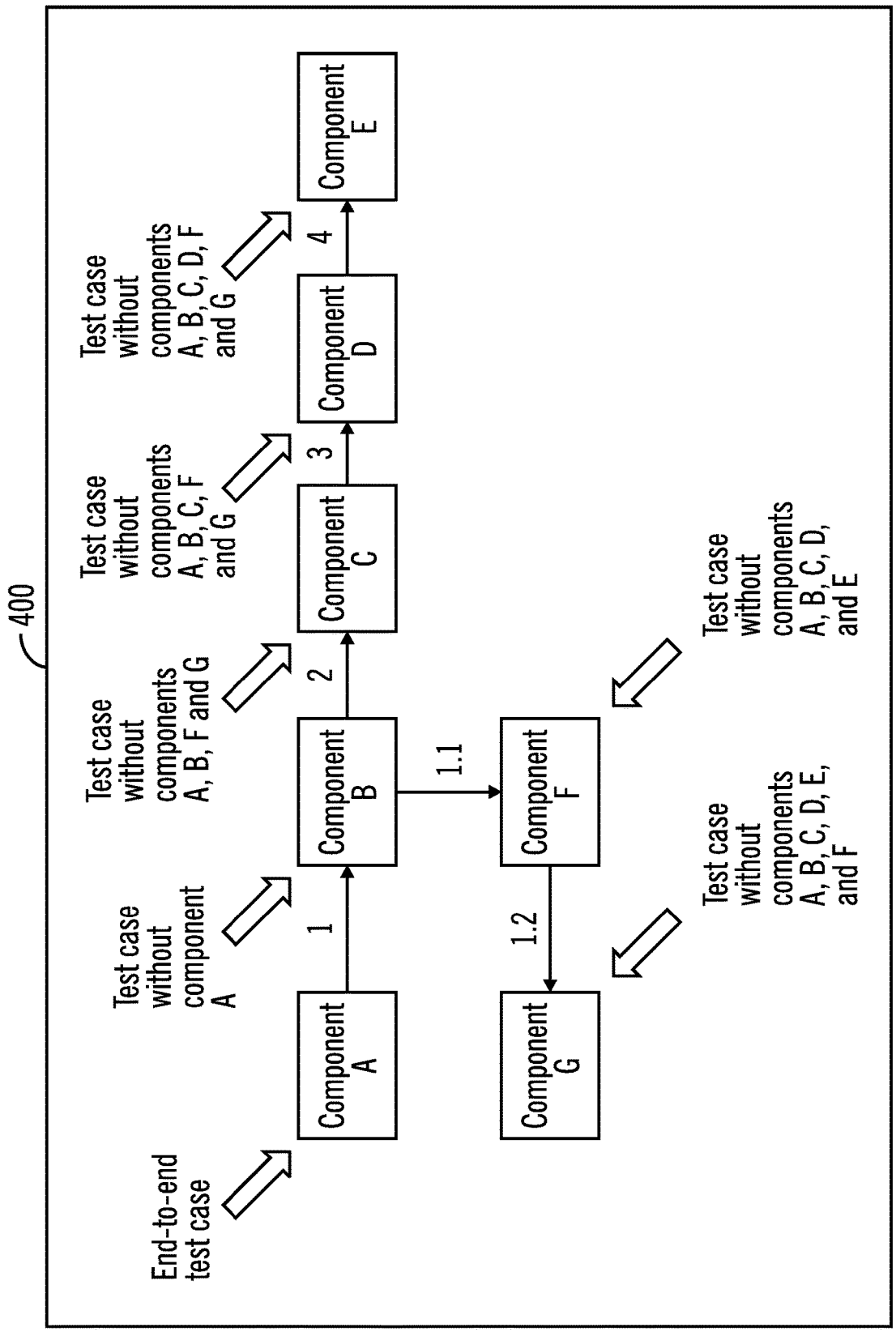
FIG. 4 illustrates, in a block diagram, authentication at a gateway in accordance with certain embodiments.

FIG. 4 illustrates, in a block diagram, authentication at a gateway in accordance with certain embodiments. In FIG. 4, there are seven components A, B, C, D, E, F, and G with cooperation between three teams to perform an end-to-end test. The end-to-end test case starts at component A. If there is an issue with the end-to-end test case completing, then, testing may be performed starting at each component (other than A) to determine which component has caused the issue. For example, if the test case starting at component B completes, then, it is determined that component A has caused the issue.

For the example of FIG. 4, the end-to-end test case failed more than 10 times during the course of development. In this example, the root cause identification procedure has not been documented. Instead, the conversation between a development team member, a QA team member, and an operations team member is recorded in natural language in the issue tracking system 130.

In certain embodiments, the diagnosis command suggestion system 140 enables the issue ticket originating QA or operations team to read the conversation on past sets of issue ticket comments and understand the diagnosis command to determine which component is causing the issue. Then, the team that manages that component is assigned the issue ticket.

Figure 5:
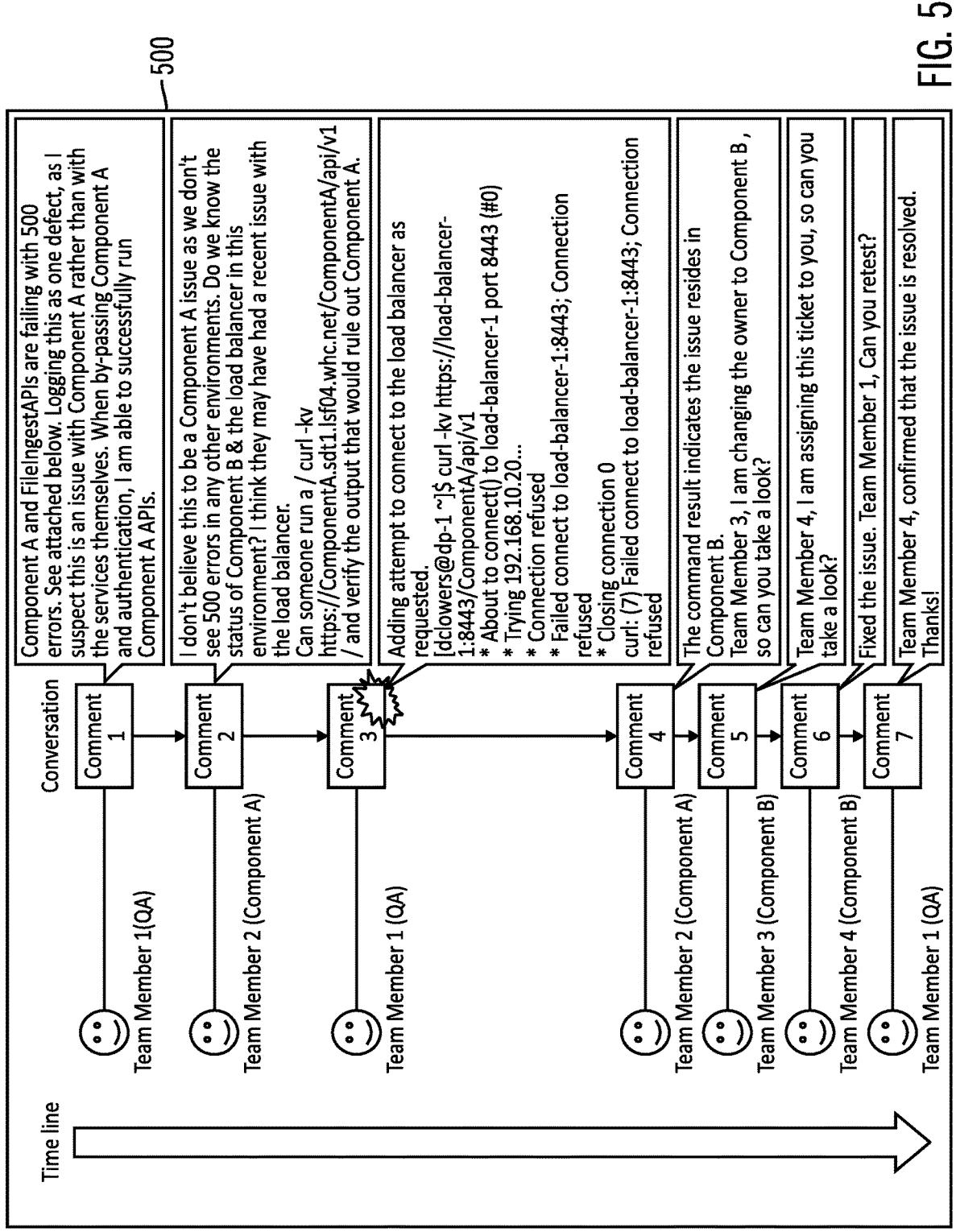
FIG. 5 illustrates an example set of issue comments in accordance with certain embodiments.

FIG. 5 illustrates an example set of issue ticket comments 500 in accordance with certain embodiments. In the example of FIG. 5, Component A and Component B were involved in the failing test case, but it is not clear which of the components was causing the issue. The diagnosis command suggestion system 140 determines which of these components is causing the issue for a subsequent similar issue.

The set of issue ticket comments 500 includes seven comments from different team members (Team Member 1 from QA, Team Member 2 from the Component A team, Team Member 3 from the Component B team, and Team Member 4 from the Component B team).

In this example, the issue ticket was first assigned to the Component A team by Team Member 1 from QA (comment 1), but the output of a diagnosis command in comment 3 indicates that Component B was causing the issue, so the issue ticket assignment was changed to the Component B team by Team Member 2 (comment 5).

When a similar issue occurs again, the diagnosis command suggestion system 140 is able to identify the same diagnosis command that should be run again to determine which component is causing the issue before assigning the issue ticket to any team. Once the component causing the issue is determined, then the issue ticket may be assigned to the team that is best suited to fix the issue. This avoids having the QA or Operations assign the issue ticket to one of the other teams by guessing and having that issue ticket reassigned to another team, which results in time loss in solving the issue.

Although the example of FIG. 5 provides a few comments and team members, a complex set of issue ticket comments may involve many teams (i.e., more than two teams) and include many comments (e.g., more than 20 comments).

The diagnosis command suggestion system 140 automatically identifies and highlights the comment that includes one or more diagnosis commands in a past set of issue ticket comments in the issue tracking system 130. The diagnosis command suggestion system 140 identifies one or more owning team change events by analyzing contextual information associated with conversation, alongside the conversation itself, in the comments of the set of issue ticket comments. The diagnosis command suggestion system 140 identifies the comment that is likely to include the diagnosis command that triggered the concluding (final) owning team change event.

Figure 6:
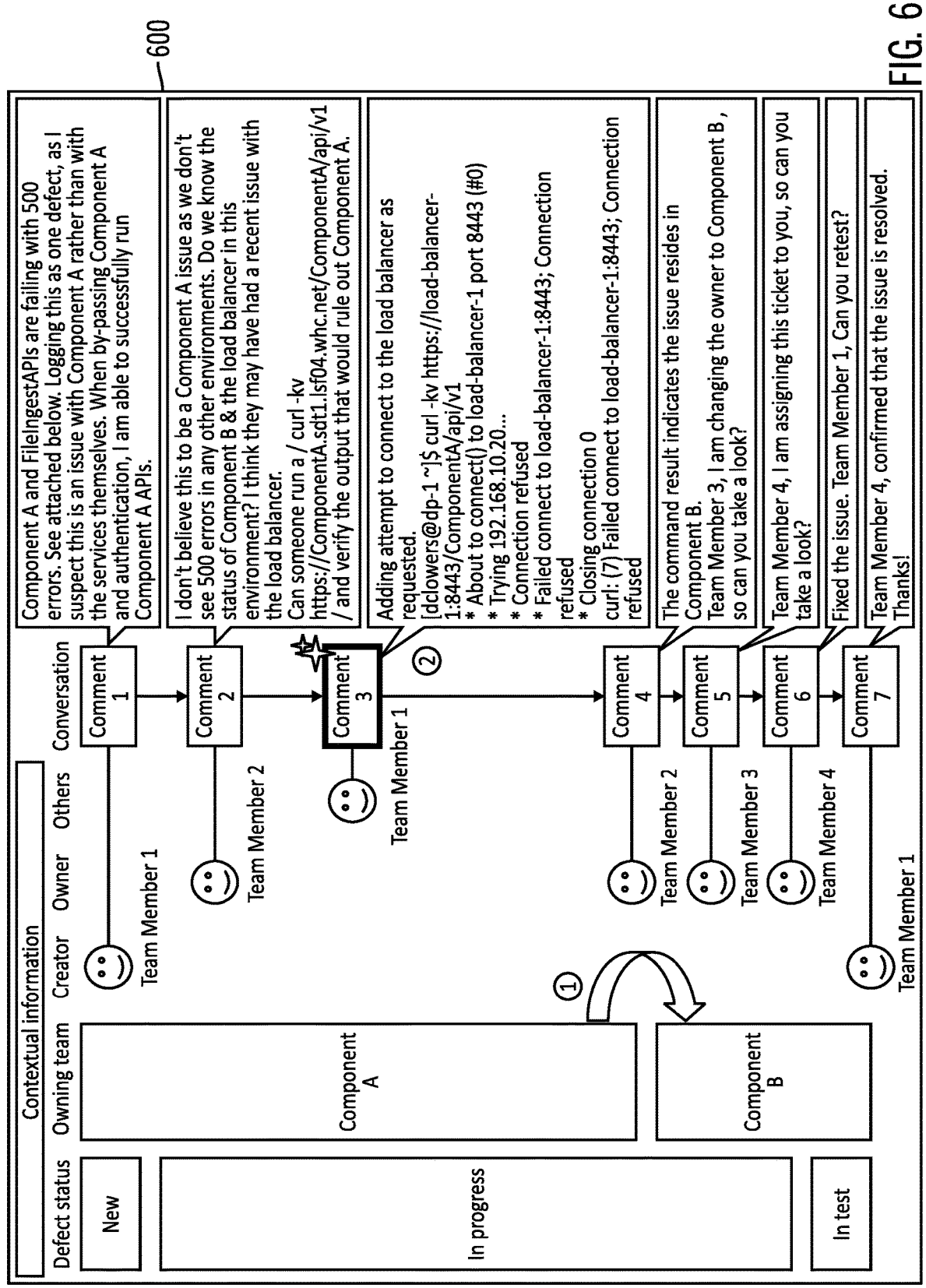
FIG. 6 illustrates a set of issue ticket comments with contextual information in accordance with certain embodiments.

FIG. 6 illustrates a set of issue ticket comments with contextual information 600 in accordance with certain embodiments. In FIG. 6, the diagnosis command suggestion system 140 uses the contextual information and the comment to identify a comment with a diagnosis command and to identify a team to be assigned an issue. The contextual information includes: defect status, owning team, creator, owner, and others (e.g., ones who are not creators or owners). The defect status is one of new (the issue ticket is created or received), in progress (team members of different teams are trying to determine the component that caused the issue), and in test (the test that indicates that the issue is resolved). In this example, the diagnosis command suggestion system 140 identifies the owning team change event by analyzing the contextual information associated with the conversation in the comments to identify owning team change events of: Team Member 1 of QA to Team Member 2 of Component A team to Team Member 3 of Component B team, and back to Team Member 1 of QA. In this example, the concluding owning team change event is from Component B team to QA. The diagnosis command suggestion system 140 also identifies that comment 3 includes the diagnosis command that triggered the owning team change event. Then, the diagnosis command suggestion system 140 identifies the Component B team as the one to be assigned the issue ticket for an issue that is similar to the one for this issue record 600.

Figure 7:
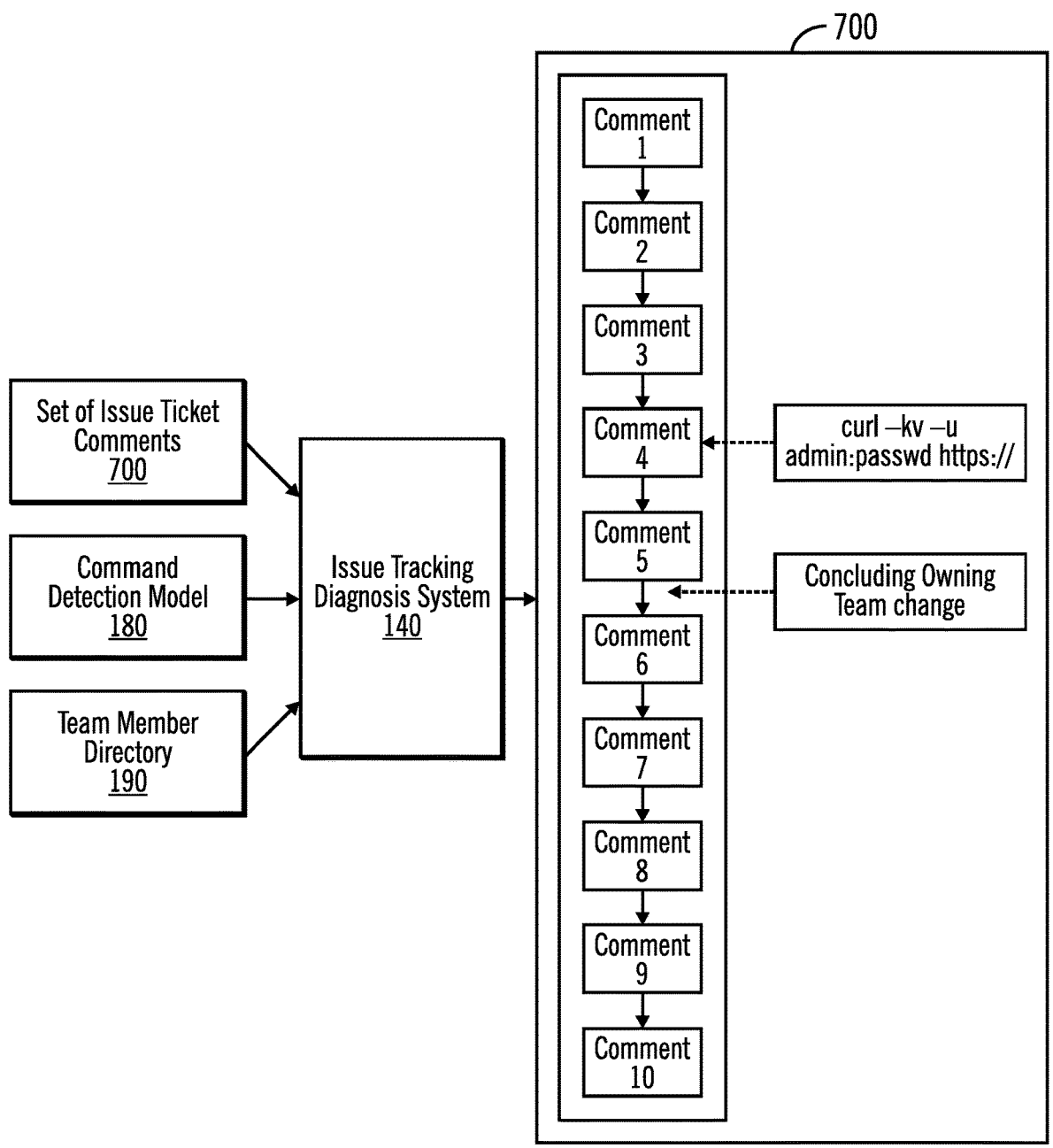
FIG. 7 illustrates inputs and outputs of an issue tracking diagnosis system in accordance with certain embodiments.

FIG. 7 illustrates inputs and outputs of the diagnosis command suggestion system 140 in accordance with certain embodiments. The diagnosis command suggestion system 140 receives inputs of a set of issue ticket comments 700 (with comments), a command detection model 180, and a team member directory 190. The diagnosis command suggestion system 140 outputs the comments with the concluding owning team change event and the comment with the diagnosis command highlighted. For example, in output 700, the concluding owning team change event is from comment 5 to comment 6, while the comment with the diagnosis command is in comment 4. Thus, in certain embodiments, the diagnosis command suggestion system 140 provides logic to identify the concluding owning team change event and logic to identify the comment that is likely to include the diagnosis command that triggered the concluding owning team change event.

FIGS. 8A and 8B illustrate example issue ticket change 800, 850 histories in accordance with certain embodiments.

In FIG. 8A, the issue ticket change history 800 shows an owner change event 810, which indicates that the owner is changing from team member D14 to team member G1. In FIG. 8B, the issue ticket change history 850 shows an owner change event 860 which indicates that the owner is changing from team Member X40 to team member L5.

Figure 9:
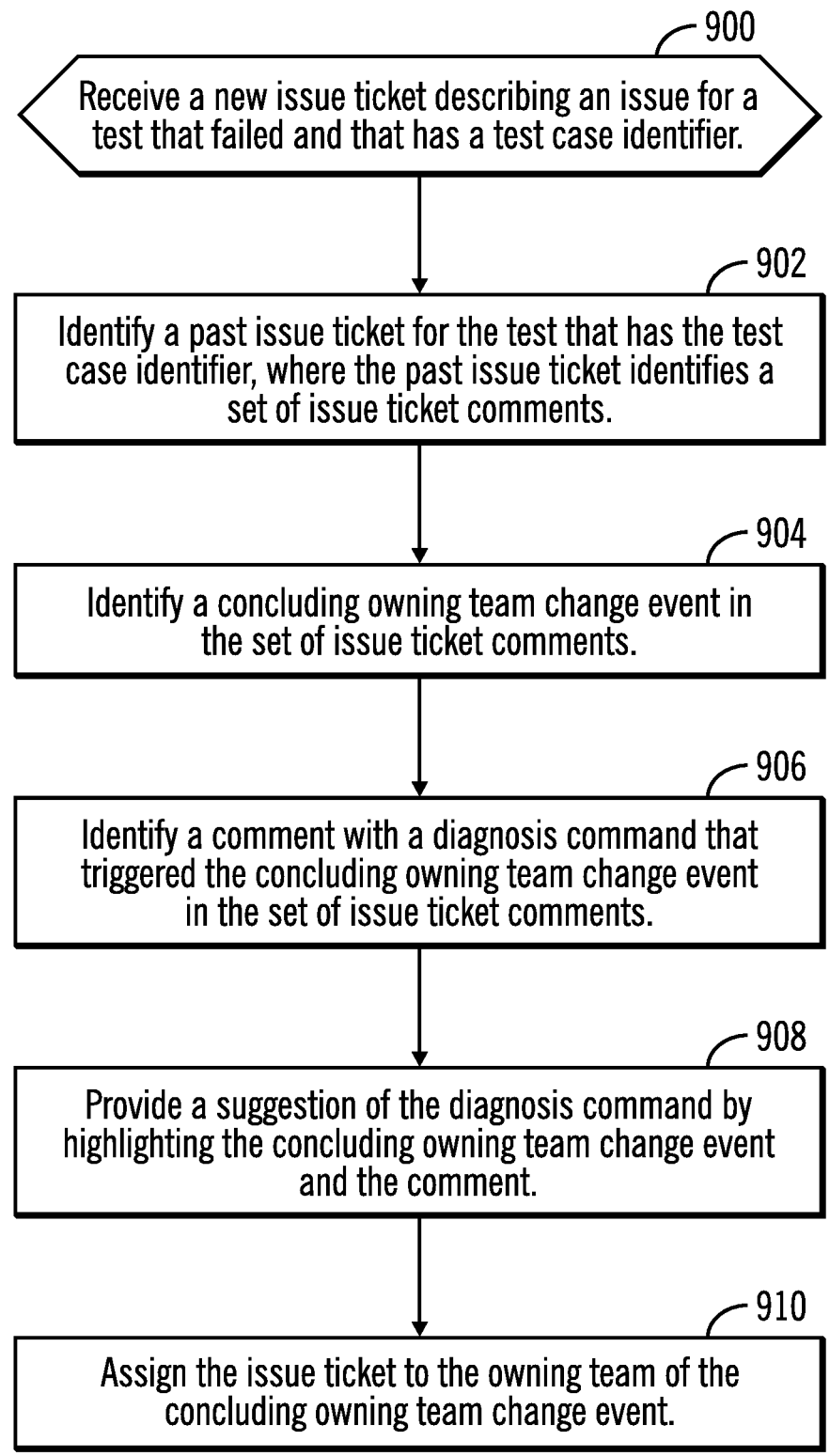
FIG. 9 illustrates, in a flowchart, operations for highlighting a concluding owning team change event and a comment with a diagnosis command in accordance with certain embodiments.

FIG. 9 illustrates, in a flowchart, operations for highlighting a concluding owning team change event and a comment with a diagnosis command in accordance with certain embodiments. Control begins at block 900 with the diagnosis command suggestion system 140 receiving a new issue ticket describing an issue (e.g., describing a problem that occurred during testing of a number of components) for a test that failed and that has a test case identifier. In block 902, the diagnosis command suggestion system 140 identifies a past issue ticket for the test that has the test case identifier, where the past issue ticket identifies a set of issue ticket comments. In certain embodiments, multiple issue tickets are identified and processed to suggest one or more diagnosis commands.

Figure 10:
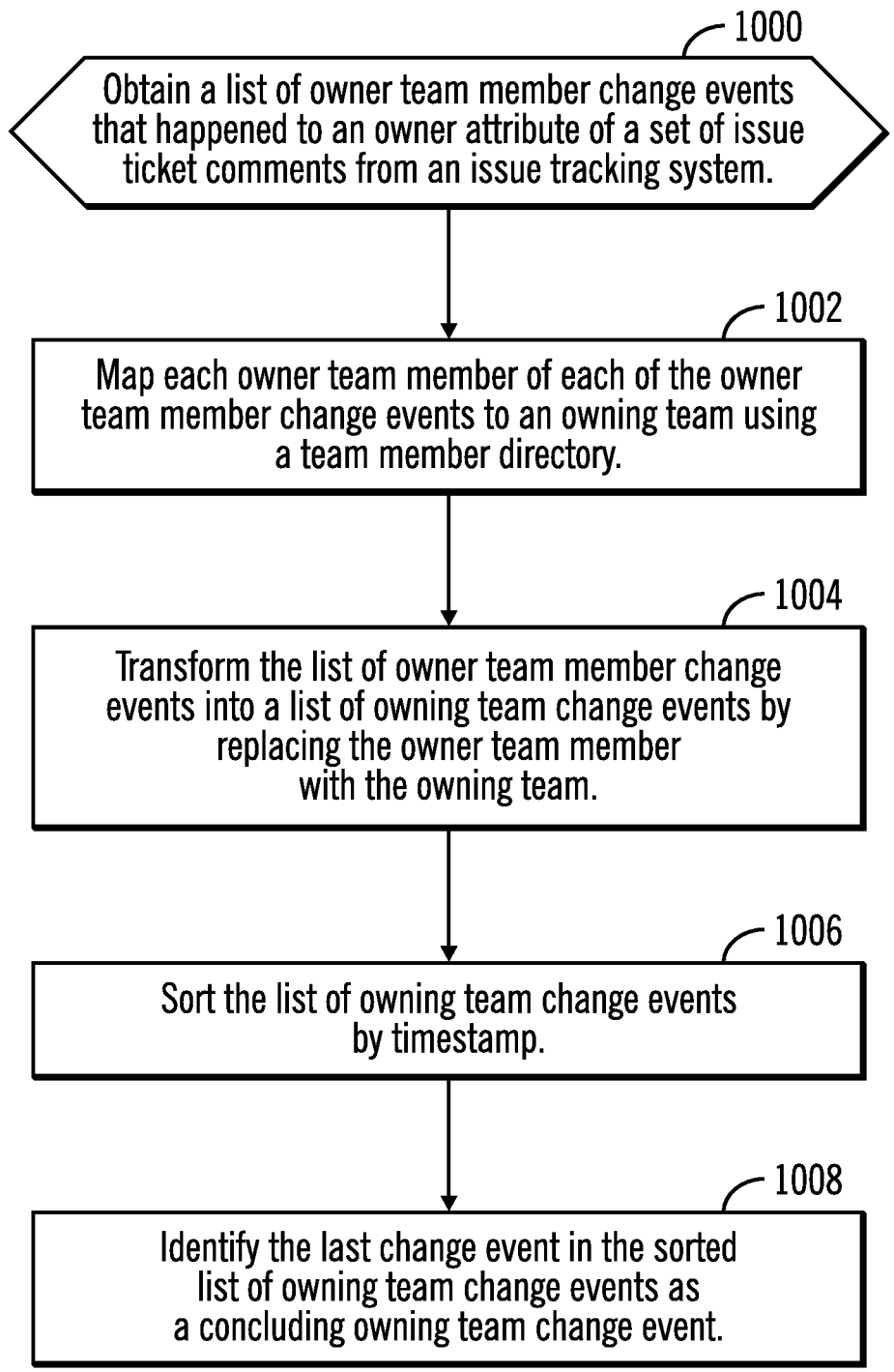
FIG. 10 illustrates, in a flowchart, operations for identifying a concluding owning team change event in accordance with certain embodiments.
Figure 11:
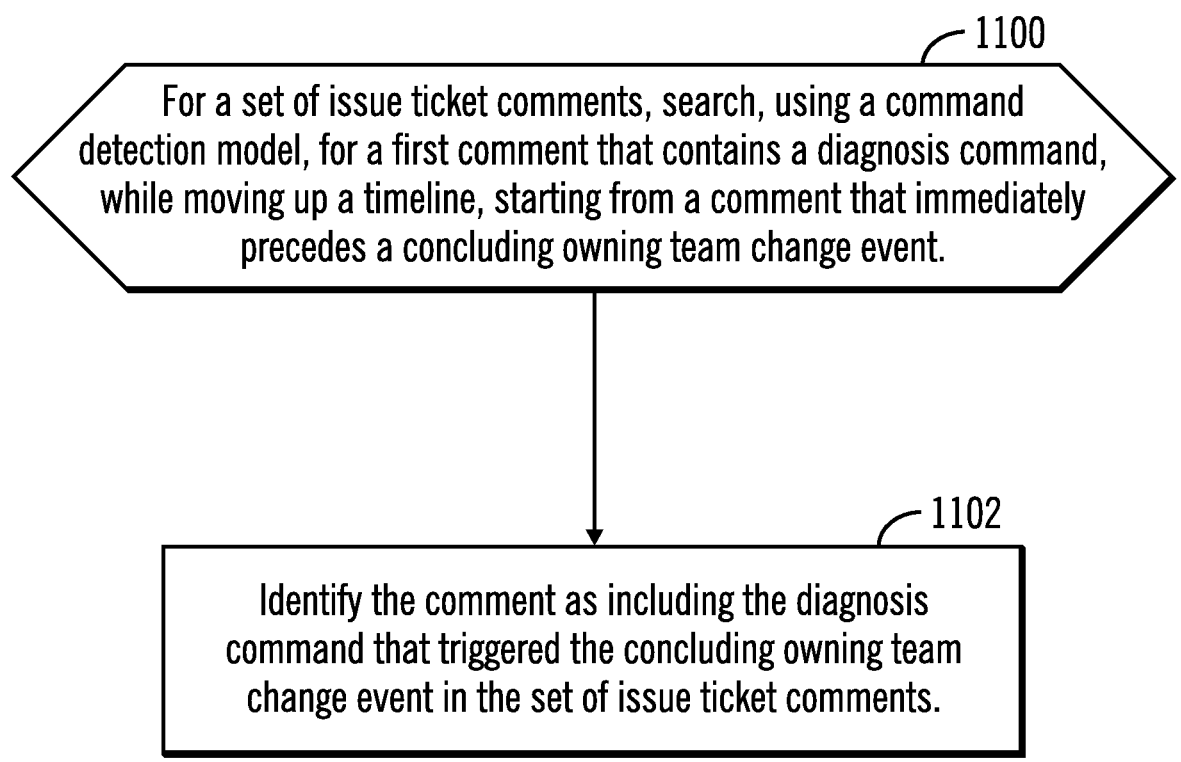
FIG. 11 illustrates, in a flowchart, operations for identifying a comment with a diagnosis command in accordance with certain embodiment.

In block 904, the diagnosis command suggestion system 140 identifies a concluding owning team change event in the set of issue ticket comments. FIG. 10 provides further details for block 904. In block 906, the diagnosis command suggestion system 140 identifies a comment with a diagnosis command that triggered the concluding owning team change event in the set of issue ticket comments. FIG. 11 provides further details for block 906.

In block 908, the diagnosis command suggestion system 140 provides a suggestion of the diagnosis command by highlighting the concluding owning team change event and the comment. The highlighting of the concluding owning team change event may include adding an indicator to point to the concluding owning team change event and/or showing the concluding owning team in a different color, with bold text, with larger text, etc. The highlighting of the comment may include adding an indicator to point to the comment and/or showing the comment in a different color, with bold text, with larger text, etc. In this manner, the diagnosis command suggestion system 140 provides a suggestion of a diagnosis command for a failed test.

In block 910, the diagnosis command suggestion system 140 assigns the issue ticket to the owning team of the concluding owning team change event. In certain embodiments, an owning team and owner team member are attributes of issue records. Also, the issue tracking system 130 stores an issue ticket change history that indicates the owning team and owner team member changes. In certain embodiments, the owner team member attribute is accurate, but the owning team attribute may not be, which is why the owner team member attribute is used to identify the correct owning team. However, in embodiments in which the owning team is accurate, the diagnosis command suggestion system 140 is able to inspect the owning team attribute directly (without mapping from the owner team member to the owning team).

FIG. 10 illustrates, in a flowchart, operations for identifying a concluding owning team change event in accordance with certain embodiments. Control begins at block 1000 with the diagnosis command suggestion system 140 obtaining a list of owner team member change events that happened to an owner attribute of a set of issue ticket comments from an issue tracking system. The change events are found in an issue ticket change history. In block 1002, the diagnosis command suggestion system 140 maps each owner team member of each of the owner team member change events to an owning team using a team member directory. In block 1004, the diagnosis command suggestion system 140 transforms the list of owner team member change events into a list of owning team change events by replacing the owner team member with the owning team. In block 1006, the diagnosis command suggestion system 140 sorts the list of owning team change events by timestamp. In block 1008, the diagnosis command suggestion system 140 identifies the last change event in the sorted list of owning team change events as a concluding owning team change event.

FIG. 11 illustrates, in a flowchart, operations for identifying a comment with a diagnosis command in accordance with certain embodiment. Control begins at block 1100 with the diagnosis command suggestion system 140, for a set of issue ticket comments, searching, using a command detection model, for a first comment that contains a diagnosis command, while moving up a timeline, starting from a comment that immediately precedes a concluding owning team change event. In block 1102, the diagnosis command suggestion system 140 identifies the comment as including the diagnosis command that triggered the concluding owning team change event in the set of issue ticket comments. In certain embodiments, the first comment found with a diagnostic command is identified as including the diagnosis command that triggered the concluding owning team change event in the issue record. In certain embodiments, the command detection model uses natural language processing to identify the comment with the diagnosis command that triggered the concluding owning team change event in the issue record.

FIG. 12 illustrates logic 1200 to identify the comment that includes the diagnosis command that triggered the concluding owning teach change event in accordance with certain embodiments. The diagnosis command suggestion system 140 searches, in an issue record, for comments that contain a diagnosis command, moving up the timeline, starting from the comment that immediately precedes the concluding owning team change event.

Thus, embodiments highlight the diagnosis command in past issue records in issue tracking system, so that operations and QA team member may easily identify the diagnosis command, without needing to rely on a development team member.

Also, embodiments are able to assign the issue ticket to the appropriate team initially, and this avoids assigning issue tickets back and forth between teams (which incurs time loss in solving the issue). Embodiments enable identifying the correct team to solve the issue with more accuracy, which leads to improved issue resolution time. In certain embodiments, the owning team change event information is used in addition to natural language processing to improve the accuracy of identifying the correct team to be assigned the issue ticket.

Embodiments analyze past issue records to identify and highlight diagnosis commands that may be used in the diagnosis of new occurrences of the same issue. Moreover, embodiments work with many different issue tracking systems.

In certain embodiment, the diagnosis commands from comments in an issue tracking system are found by logging conversations between team members relating to diagnosis in issue tracking system, identifying a concluding owning team change event by analyzing contextual information from the conversation log, and identifying the comment that includes the diagnosis command that triggered the concluding owning team change event. Also, the identifying includes getting the list of all change events that happened to an owner team member attribute, mapping each owner team member to an owning team using a team member directory, transforming the owner team member change event list into an owning team change event list, sorting the owning team change event list by timestamp, and selecting the last change event in the owning team change event list as concluding owning team change event.

Figure 13:
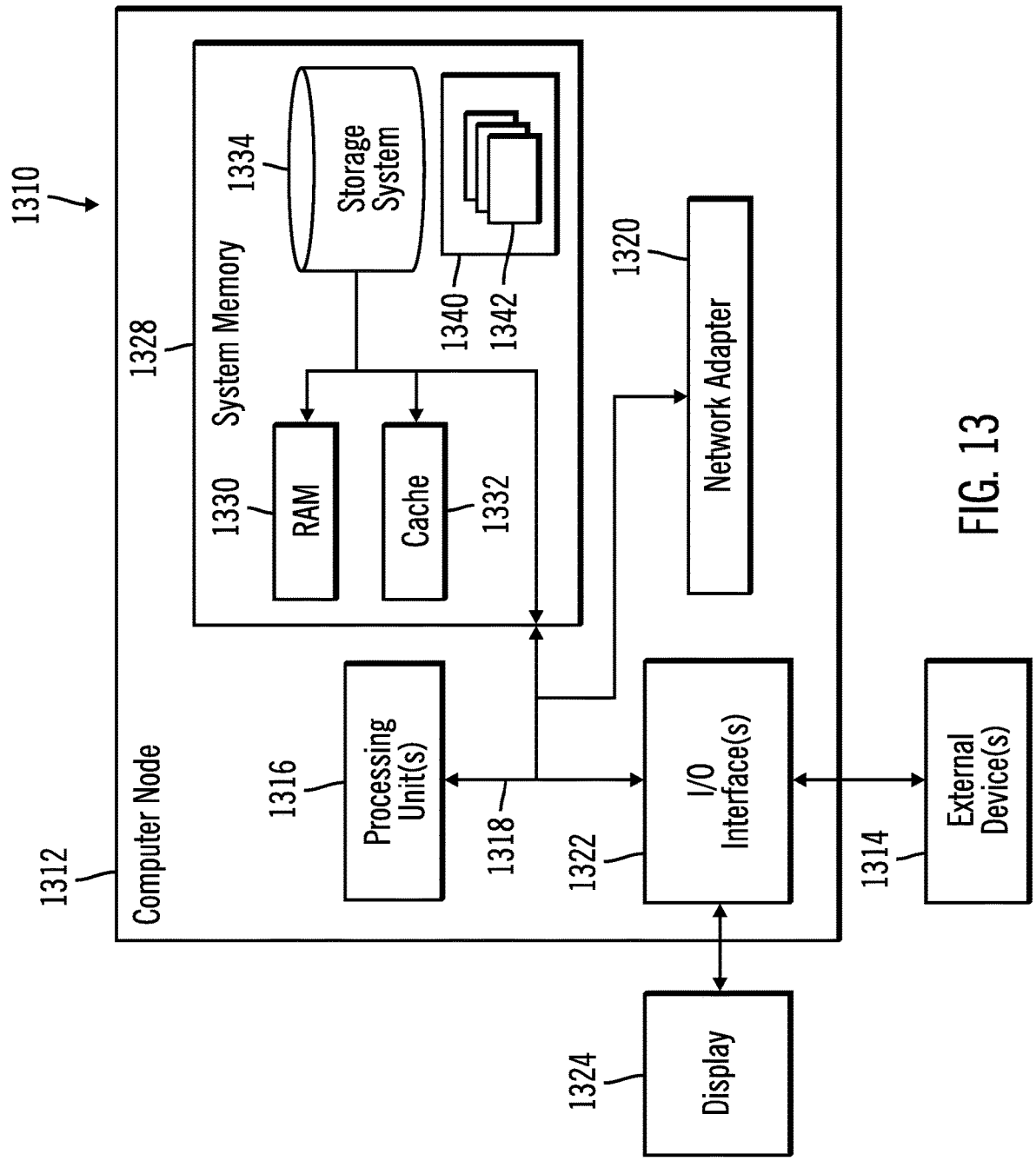
FIG. 13 illustrates a computing node in accordance with certain embodiments.

FIG. 13 illustrates a computing environment 1310 in accordance with certain embodiments. In certain embodiments, the computing environment is a cloud computing environment. Referring to FIG. 13, computer node 1312 is only one example of a suitable computing node and is not intended to suggest any limitation as to the scope of use or functionality of embodiments of the invention described herein. Regardless, computer node 1312 is capable of being implemented and/or performing any of the functionality set forth hereinabove.

The computer node 1312 may be a computer system, which is operational with numerous other general purpose or special purpose computing system environments or configurations. Examples of well-known computing systems, environments, and/or configurations that may be suitable for use with computer node 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1312 may be described in the general context of computer system executable instructions, such as program modules, being executed by a computer system. Generally, program modules may include routines, programs, objects, components, logic, data structures, and so on that perform particular tasks or implement particular abstract data types. Computer node 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer node 1312 is shown in the form of a general-purpose computing device. The components of computer node 1312 may include, but are not limited to, one or more processors or processing units 1316, a system memory 1328, and a bus 1318 that couples various system components including system memory 1328 to one or more processors or processing units 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1312 typically includes a variety of computer system readable media. Such media may be any available media that is accessible by computer node 1312, and it includes both volatile and non-volatile media, removable and non-removable media.

System memory 1328 can include computer system readable media in the form of volatile memory, such as random access memory (RAM) 1330 and/or cache memory 1332. Computer node 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, system memory 1328 may include at least one program product having a set (e.g., at least one) of program modules that are configured to carry out the functions of embodiments of the invention.

Program/utility 1340, having a set (at least one) of program modules 1342, may be stored in system memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer node 1312 may also communicate with one or more external devices 1314 such as a keyboard, a pointing device, a display 1324, etc.; one or more devices that enable a user to interact with computer node 1312; and/or any devices (e.g., network card, modem, etc.) that enable computer node 1312 to communicate with one or more other computing devices. Such communication can occur via Input/Output (I/O) interfaces 1322. Still yet, computer node 1312 can communicate with one or more networks such as a local area network (LAN), a general wide area network (WAN), and/or a public network (e.g., the Internet) via network adapter 1320. As depicted, network adapter 1320 communicates with the other components of computer node 1312 via bus 1318. It should be understood that although not shown, other hardware and/or software components could be used in conjunction with computer node 1312. Examples, include, but are not limited to: microcode, device drivers, redundant processing units, external disk drive arrays, RAID systems, tape drives, and data archival storage systems, etc.

In certain embodiments, each of the client computers 100a . . . 100m and the server computer 120 has the architecture of computer node 1312. In certain embodiments, each of the client computers 100a . . . 100m and the server computer 120 are part of a cloud infrastructure. In certain alternative embodiments, each of the client computers 100a . . . 100m and the server computer 120 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
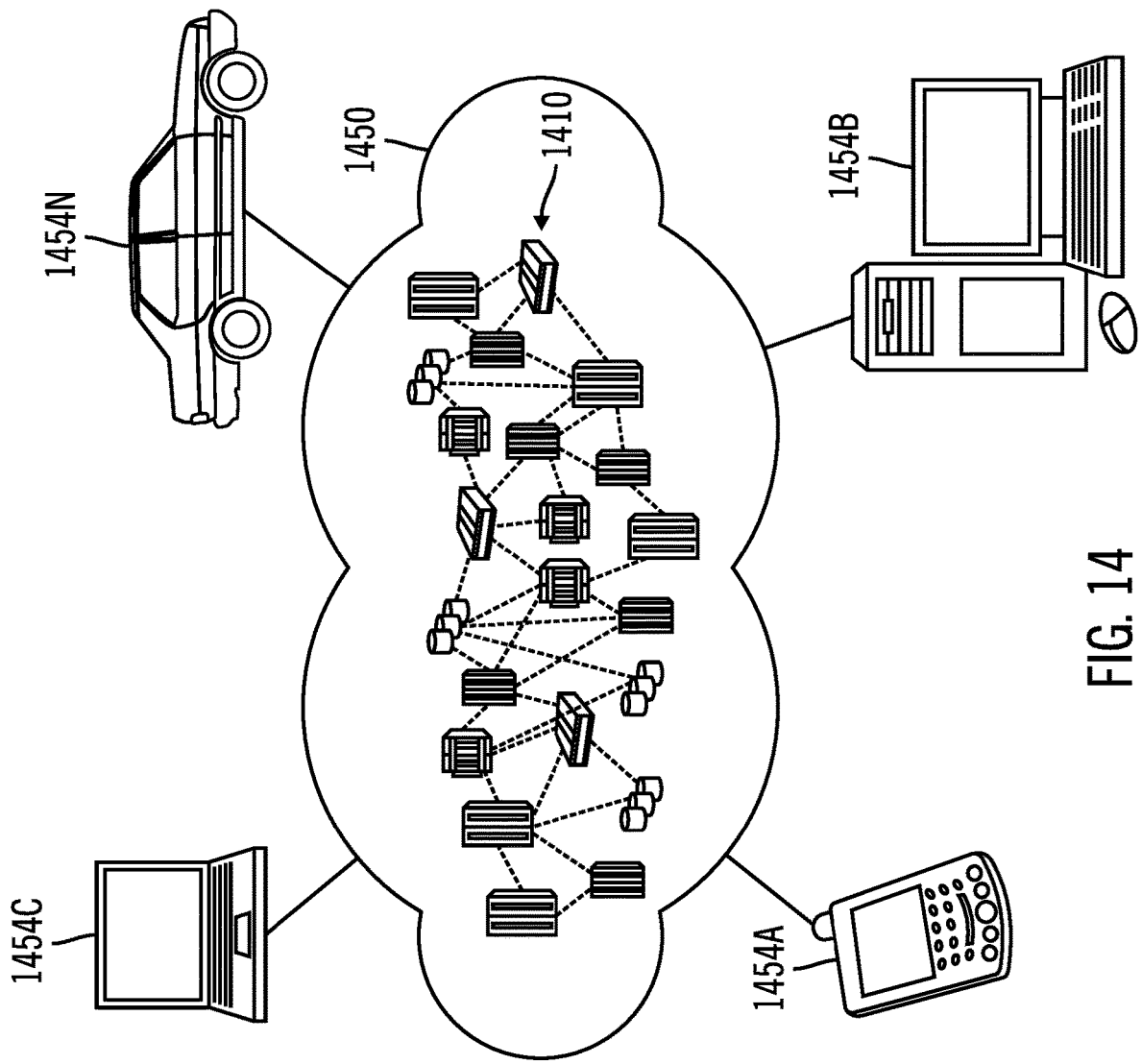
FIG. 14 illustrates a cloud computing environment in accordance with certain embodiments.

Referring now to FIG. 14, illustrative cloud computing environment 1450 is depicted. As shown, cloud computing environment 1450 includes one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
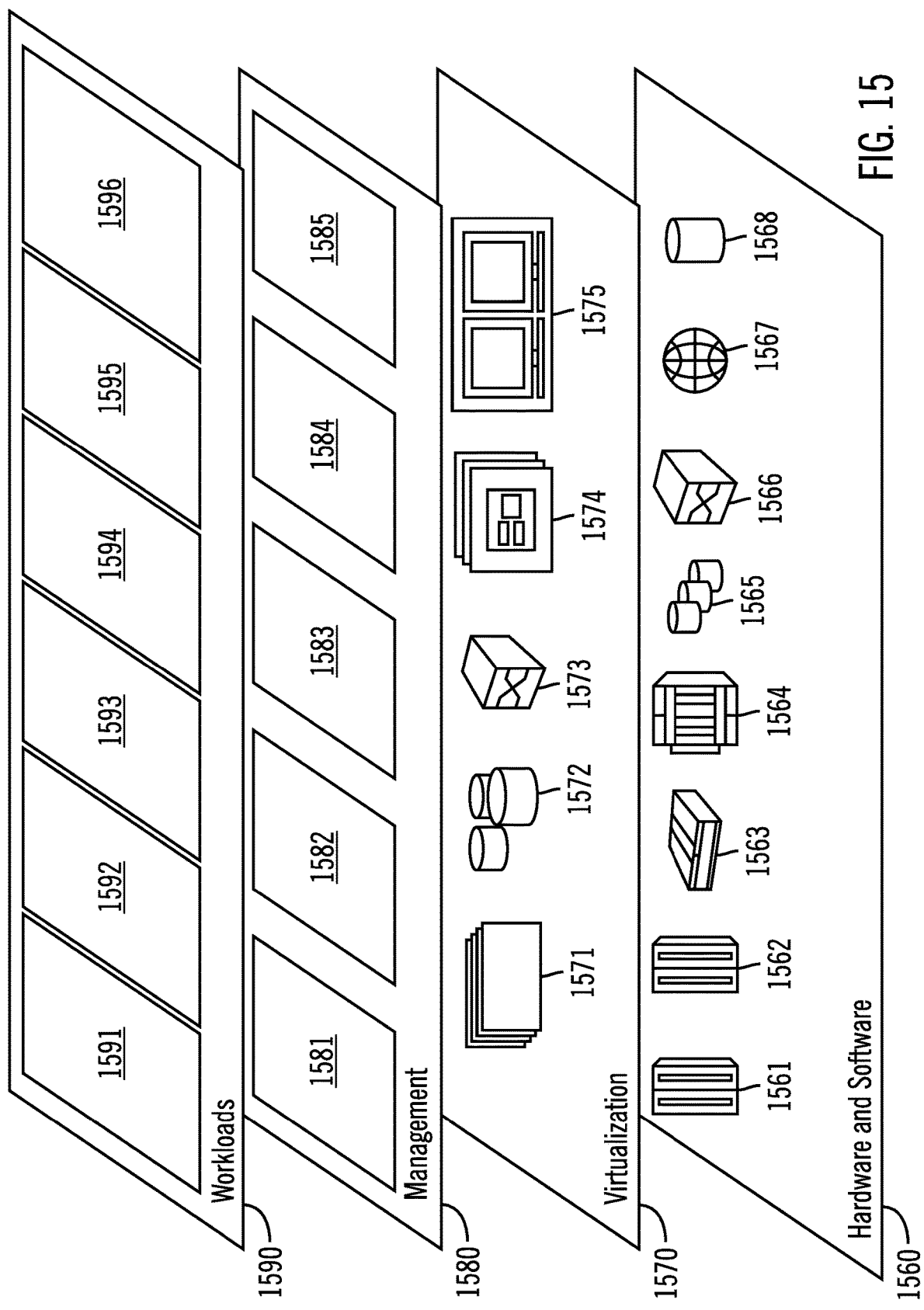
FIG. 15 illustrates abstraction model layers in accordance with certain embodiments.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and identifying diagnosis commands from comments in an issue tracking system 1596.

Thus, in certain embodiments, software or a program, implementing identifying diagnosis commands from comments in an issue tracking system in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
   receiving a new issue ticket describing an issue for a test that failed and that has a test case identifier;
   identifying a past issue ticket for the test that has the test case identifier, wherein the past issue ticket identifies a set of issue ticket comments;
   identifying a concluding owning team change event in the set of issue ticket comments by:
      obtaining a list of owner team member change events that happened to an owner attribute of the set of issue ticket comments from an issue tracking system;
      mapping each owner team member of each of the owner team member change events to an owning team using a team member directory;
      transforming the list of owner team member change events into a list of owning team change events by replacing an owner team member with the owning team; and
      sorting the list of owning team change events by timestamp, wherein a last change event in the sorted list of owning team change events is identified as the concluding owning team change event;
   identifying a comment with a diagnosis command that triggered the concluding owning team change event in the set of issue ticket comments;
   providing a suggestion of the diagnosis command by highlighting the concluding owning team change event and the comment; and
   assigning the new issue ticket to an owning team of the concluding owning team change event.

2. The computer-implemented method of claim 1, wherein the list of owner team member change events is obtained from an issue ticket change history of the set of issue ticket comments.

3. The computer-implemented method of claim 1, further comprising operations for:
   searching for the comment that contains the diagnosis command, while moving up a timeline, starting from a comment that immediately precedes the concluding owning team change event.

4. The computer-implemented method of claim 1, wherein a command detection model identifies the comment with the diagnosis command that triggered the concluding owning team change event in the set of issue ticket comments.

5. The computer-implemented method of claim 1, wherein a Software as a Service (SaaS) is configured to perform the operations of the method.

6. A computer program product, the computer program product comprising a computer readable storage medium having program code embodied therewith, the program code executable by at least one processor to perform operations comprising:
    receiving a new issue ticket describing an issue for a test that failed and that has a test case identifier;
    identifying a past issue ticket for the test that has the test case identifier, wherein the past issue ticket identifies a set of issue ticket comments;
    identifying a concluding owning team change event in the set of issue ticket comments by
        obtaining a list of owner team member change events that happened to an owner attribute of the set of issue ticket comments from an issue tracking system;
        mapping each owner team member of each of the owner team member change events to an owning team using a team member directory;
        transforming the list of owner team member change events into a list of owning team change events by replacing an owner team member with the owning team; and
        sorting the list of owning team change events by timestamp, wherein a last change event in the sorted list of owning team change events is identified as the concluding owning team change event;
    identifying a comment with a diagnosis command that triggered the concluding owning team change event in the set of issue ticket comments;
    providing a suggestion of the diagnosis command by highlighting the concluding owning team change event and the comment; and
    assigning the new issue ticket to an owning team of the concluding owning team change event.

7. The computer program product of claim 6, wherein the list of owner team member change events is obtained from an issue ticket change history of the set of issue ticket comments.

8. The computer program product of claim 6, wherein the program code is executable by the at least one processor to perform further operations comprising:
    searching for the comment that contains the diagnosis command, while moving up a timeline, starting from a comment that immediately precedes the concluding owning team change event.

9. The computer program product of claim 6, wherein a command detection model identifies the comment with the diagnosis command that triggered the concluding owning team change event in the set of issue ticket comments.

10. The computer program product of claim 6, wherein a Software as a Service (SaaS) is configured to perform the operations of the computer program product.

11. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    receiving a new issue ticket describing an issue for a test that failed and that has a test case identifier;
    identifying a past issue ticket for the test that has the test case identifier, wherein the past issue ticket identifies a set of issue ticket comments;
    identifying a concluding owning team change event in the set of issue ticket comments by:
        obtaining a list of owner team member change events that happened to an owner attribute of the set of issue ticket comments from an issue tracking system;
        mapping each owner team member of each of the owner team member change events to an owning team using a team member directory;
        transforming the list of owner team member change events into a list of owning team change events by replacing an owner team member with the owning team; and
        sorting the list of owning team change events by timestamp, wherein a last change event in the sorted list of owning team change events is identified as the concluding owning team change event;
    identifying a comment with a diagnosis command that triggered the concluding owning team change event in the set of issue ticket comments;
    providing a suggestion of the diagnosis command by highlighting the concluding owning team change event and the comment; and
    assigning the new issue ticket to an owning team of the concluding owning team change event.

12. The computer system of claim 11, wherein the list of owner team member change events is obtained from an issue ticket change history of the set of issue ticket comments.

13. The computer system of claim 11, further comprising operations for:
    searching for the comment that contains the diagnosis command, while moving up a timeline, starting from a comment that immediately precedes the concluding owning team change event.

14. The computer system of claim 11, wherein a command detection model identifies the comment with the diagnosis command that triggered the concluding owning team change event in the set of issue ticket comments.

15. The computer system of claim 11, wherein a Software as a Service (SaaS) is configured to perform the operations of the computer system.

\* \* \* \* \*